May 15, 1928.
J. CREDO
1,669,973
METHOD AND APPARATUS FOR SCREENING WET MATERIAL
Filed Dec. 4, 1926
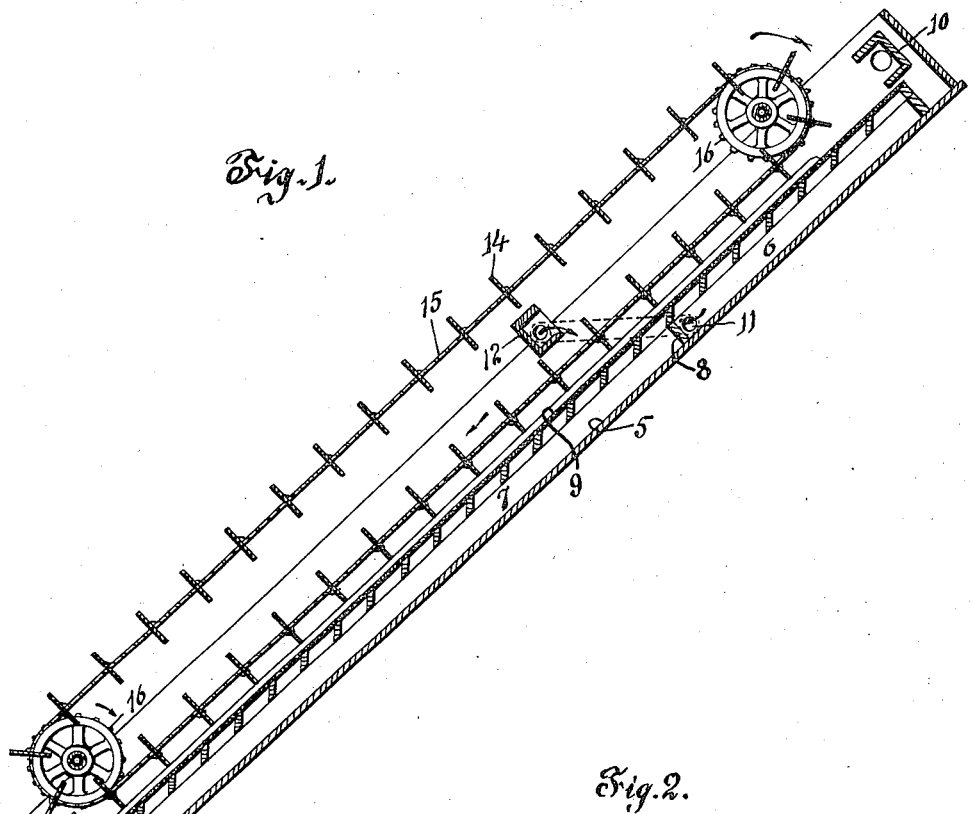
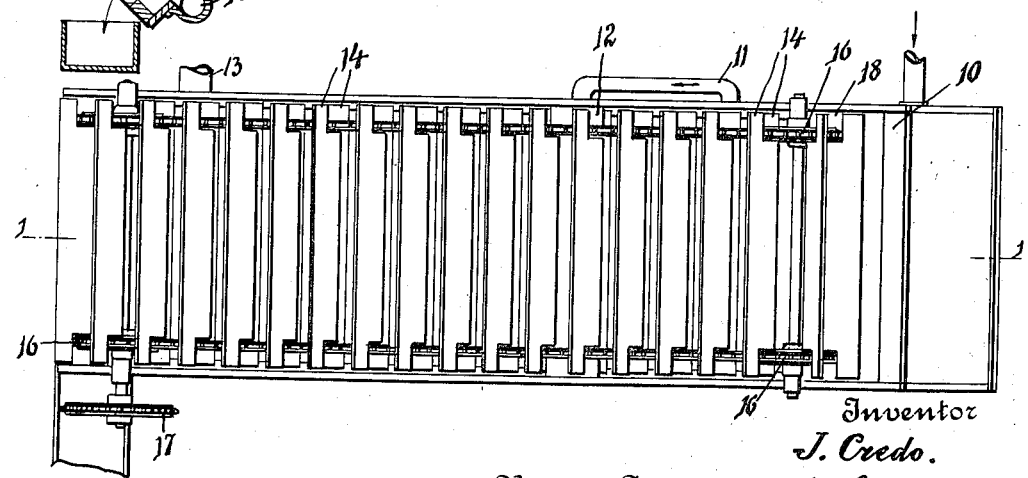
Inventor
J. Credo.
By Attorney Patented May 15, 1928.

1,669,973

UNITED STATES PATENT OFFICE.

JULIUS CREDO, OF LOUISVILLE, KENTUCKY, ASSIGNOR TO LOUISVILLE DRYING MACHINERY CO. INC., OF LOUISVILLE, KENTUCKY, A CORPORATION OF KENTUCKY.

METHOD AND APPARATUS FOR SCREENING WET MATERIAL.

Application filed December 4, 1926. Serial No. 152,561.

My invention relates to a method for screening wet materials such as distillery slop, paper pulp, cotton linters, reclaimed rubber, etc., and the object thereof is to provide a more economical and efficient method of reclamation, which method is particularly characterized by the prevention of formation of channels in the layer.

Another object of the invention is to provide an apparatus in which the layer on the screen is maintained substantially uniform in thickness while the wet material progresses over the screen.

In the usual type of screen box the material slides down the perforated metal which forms the screen, very slowly, and the watery material usually channels through the layer of filtered substance thereby reducing the filtering effect and creating not only a loss of fine material but also reducing the capacity of the screen.

To avoid this, I provide a spreader over the screen which prevents the formation of channels and furthermore maintains the layer on the screen substantially uniform in thickness throughout.

In the appended drawing forming part of this application, Figure 1 is a vertical section on line 1—1 of Figure 2 of a screening apparatus embodying my invention, and Figure 2 is a plan view of the apparatus.

Referring to the drawing 5 is a box which is divided transversely by a partition 8 into an upper section 6 and a lower section 7, both sections of the box being covered by a screen 9. The box is supported at an angle such that material fed on to the screen will progress gravitationally.

A feeding trough 10 is provided at the upper part of the section 6 of the box 5. Said section 6 has an outlet 11 at its lower end, which leads to a trough 12, disposed to discharge on the screen 9 in proximity of the partition 8 over the section 7 of the box. The section 7 of the box has also an outlet 13, to carry off the material that passes through the screen.

To prevent formation of channels in the layer of material traveling gravitationally on the screen 9, I provide a spreader in the form of paddles 14 which travel over the screen 9. The paddles are carried by chains 15, engaged by suitable sprockets 16 to which motion is imparted from a drive sprocket 17. The paddles 14 are maintained in their movement over the screen in a plane parallel thereto by supporting the row of paddles at the screen on a suitable ledge 18, provided on the side of the structure which carries the spreader mechanism.

The paddles of the spreader progress in the same direction as the material as I have found that the angle of repose of the partly dried substance is usually steeper than can be obtained in any practical apparatus.

By dividing the box 5 into two sections so that the upper section feeds over to the lower section, I get the effect of a double filtration of the material fed on to the screen. This double filtration removes to a great extent, the fine material which is carried out with the filtrate in the first screening and therefore, increases the efficiency. As a matter of fact the filtering is not done by the perforated screen except by the upper part of the screen but is actually done by the layer of solids on the screen. It is, for this reason that the double filtration is resorted to.

By employing the spreader over the screen the solid layer is maintained substantially uniform and therefore, its efficiency over the screen is substantially the same, and by the use of the spreader such a screen is rendered so efficient that secondary pressing, which is done on a roller press is obviated. Further it usually increases the capacity of a plant because of the almost perfect recovery of the extremely fine substances.

I claim:

1. A method for filtering material on a screen, which consists in feeding wet material gravitationally over a screen, maintaining the material in a substantially uniform layer while moving on the screen collecting material passed through a portion of the screen and returning it to the material on the remaining portion of the screen.

2. A method for filtering wet material on a screen which consists in feeding the material gravitationally on the screen, spreading the material on the screen in the direction of its motion to prevent channelling in the layer of the material on the screen, collecting material passed through a portion of the screen and returning it to the material on the remaining portion of the screen.

3. An apparatus for filtering wet material comprising a screen on which the material moves gravitationally, a main feed for wet material to the screen nearest the highest point of the screen, a box for collecting material that passes through a portion of the screen, a secondary feed from the box to the screen to deliver material for the remaining portion of the screen, in addition to the material delivered from the main feed.

4. An apparatus for filtering wet material comprising a screen on which the material moves gravitationally, a main feed for wet material to the screen nearest the high point of the screen, a box for collecting material that passes through a higher portion of the screen, a secondary gravitational feed from the box to the lower remaining portion of the screen, and means travelling over the entire screen for maintaining a uniform layer of material thereon.

JULIUS CREDO.